(No Model.)
G. S. SPRING.
Harrow.
No. 243,321.  Patented June 21, 1881.
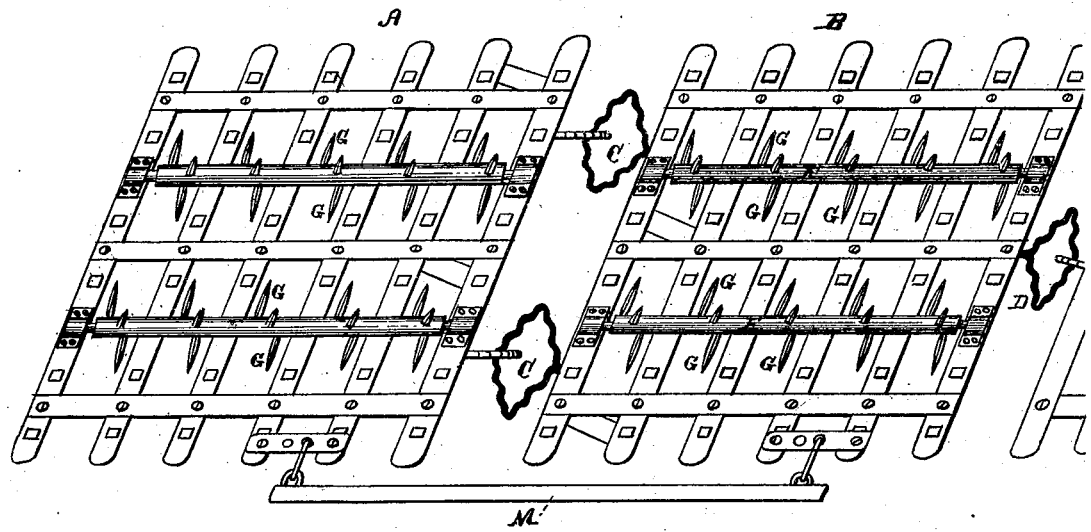
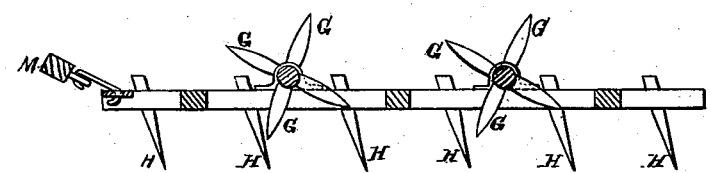
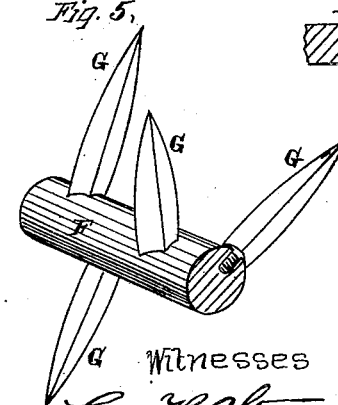
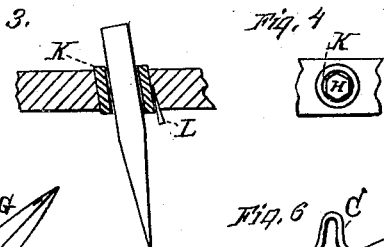
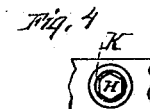
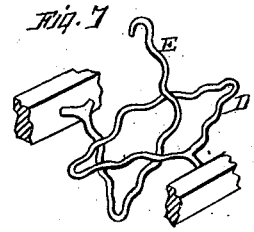
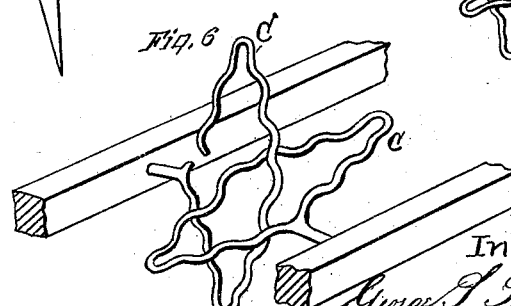
Witnesses
Geo. H. Strong.
Frank A. ...
Inventor
George S. Spring
By Dewey & Co.,
Attys

UNITED STATES PATENT OFFICE.

GEORGE S. SPRING, OF WILLOW, ASSIGNOR OF ONE-HALF TO L. W. McDONALD, OF YOLO COUNTY, CALIFORNIA.

HARROW.

SPECIFICATION forming part of Letters Patent No. 243,321, dated June 21, 1881.

Application filed December 27, 1880. (No model.)

*To all whom it may concern:*

Be it known that I, GEORGE S. SPRING, of Willow, county of Colusa, State of California, have invented an Improved Harrow; and I hereby declare the following to be a full, clear, and exact description thereof.

My invention relates to that class of agricultural implements known as "harrows;" and it consists in certain details of construction, as hereinafter described and specifically claimed.

Referring to the accompanying drawings, Figure 1 is a top view of my harrow. Fig. 2 is a side section. Figs. 3, 4, 5, 6, and 7 are details of construction.

Let A represent one section of the harrow; B, a second section. There is also a third and fourth section, which are joined and constructed in the like manner to A and B, and need not herein be shown, all of said sections being constructed in diamond shape, as shown, of timbers jointed to each other and bolted to secure them firmly together. Sections A and B are jointed together by the connecting-links C. These links are made of the shape as shown, having their inner surfaces irregularly notched or corrugated, as seen in the drawings. One end is driven into one section so as to lie horizontal, and the other is driven into the other section so as to be vertical, one having an opening to allow the other, which is unbroken, to fit in. There are two complete links, C, joining the two sections A and B. The advantage of these links is that their notched or corrugated surfaces will give to the two sections a zigzag or vibratory motion and conform them to the character of the ground, allowing them to be held evenly in sandy or even soil, and when in broken or lumpy soil to permit independent motion on the part of each, which motion, when once determined, is fixed for the immediate purpose by the notches holding each other in position. This advantage could not be gained in having a smooth link, because, although they would allow the sections to have independent motion, the zigzag sudden movement could not be had, nor could the sections be held firmly when required to be in a certain position to cut up lumpy soil. The links C, in being made of a diamond shape, induce a gradual movement from one notch to another, permitting each section to conform itself to the necessity of the movement caused by the irregularity of the surface. The third and fourth sections are connected together in a similar manner by similar links. The first two sections A and B are connected to the second two sections by simply having one complete connecting-link between them, and varied slightly in shape, one part of the link being horizontal and connected, as shown at D, and the other, over which it fits, being a vertical corrugated bar turned over at the top, as shown at E. This link is placed in the middle of the sections, and is for the purpose of allowing an easy turn to the entire harrow when necessary.

In each section, between the transverse timbers, I construct an extended hub, F, lying in appropriate grooves or hollows on top of the straight timbers and across said timbers, and journaled at the ends, as shown. The hubs F are provided with teeth or blades G at regular intervals around them and for their entire length. Said teeth or blades G revolve between the interstices of the frame-timbers, and are long enough to cut the straw or stubble beneath. When the harrow is in motion the blades G are revolved and cut and clear the stubble and prevent the implement from becoming clogged. Each section is provided with two hubs F, with their respective blades G, for the purpose hereinbefore set forth. The blades G, when the harrow meets a large clod of soil or an unusual obstruction in shape of stubble, must cut through it, because the corrugated links C will hold the sections firmly down, so that they cannot pass over without cutting it.

The hubs F can be removed when the harrow is working in even or sandy soil, and the assistance of their blades G is not required. In order to prevent the blades G from impeding the proper motion of the sections, I have so journaled the hubs F as to give them a slight side play, so that their blades G may, when necessary, conform themselves to the motion of the sections.

In the frame-timbers of each section, at desirable points, are the harrow-teeth H. These teeth H are made of solid steel, and are of a shape other than round, in this case being octagonal, and are sharpened down, as shown.

Set in the frame-timbers are the hollow tubular casings K, made of appropriate metal, generally of gas-pipe. They are secured to the timbers by the keys L, as shown.

The teeth H are driven through these hollow casings, and, being octagonal, will fit them tightly. The teeth being of steel and the casings of softer metal will make a tight and secure fit. The heads of the teeth H may extend any convenient distance above the casing K.

When the point of a tooth is worn off it can be driven down through the casing and the operation repeated until the tooth is worn so short that the casing can no longer hold it. When one edge of a tooth becomes dull from wear the key L can be loosened and the casing with its inclosed tooth turned around to present a fresh edge, said teeth thus being self-sharpening. The use of the hollow casing K thus permits the teeth to be extended, and I can use a short tooth, whereby the expense of a new steel tooth is avoided.

I can incline the teeth H backward at an angle with the frame-timbers to make them offer less resistance to the draft.

In front of the sections is the draft bar or rod M, to which the evener or double-tree is to be attached.

Having thus described my invention, what I claim as new, and desire to secure by Letters Patent, is—

The diamond-shaped links C, having their inner surfaces notched or corrugated, by which different sections of a harrow are joined together and are momentarily held in different positions with relation to each other, substantially as described.

In witness whereof I have hereunto set my hand.

GEO. S. SPRING.

Witnesses:
S. H. NOURSE,
FRANK A. BROOKS.